(12) United States Patent
Das et al.

(10) Patent No.: US 7,292,854 B2
(45) Date of Patent: Nov. 6, 2007

(54) EXPRESS SIGNALING IN A WIRELESS COMMUNICATION SYSTEM

(75) Inventors: Arnab Das, Old Bridge, NJ (US); Farooq Ullah Khan, Manalapan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 411 days.

(21) Appl. No.: 10/077,613

(22) Filed: Feb. 15, 2002

(65) Prior Publication Data

US 2003/0157953 A1 Aug. 21, 2003

(51) Int. Cl.
*H04Q 7/20* (2006.01)
(52) U.S. Cl. .................. 455/434; 370/320; 370/471
(58) Field of Classification Search .......... 455/437, 455/574, 434, 38.3; 370/320, 335, 342, 441, 370/471
See application file for complete search history.

(56) References Cited

U.S. PATENT DOCUMENTS 5,600,635 A * 2/1997 Hamaki et al. ............ 370/280
6,226,279 B1 * 5/2001 Hansson et al. ........... 370/329
2002/0110181 A1 * 8/2002 Willenegger ............... 375/141
2002/0170013 A1 * 11/2002 Bolourchi et al. .......... 714/758

* cited by examiner

*Primary Examiner*—Joseph Feild
*Assistant Examiner*—Phuoc H Doan

(57) ABSTRACT

A method for transmitting control information in a wireless communication network is provided in which one or more prescribed fields in an existing control channel structure are modified to enable express signaling directly between a base station and at least one mobile station without the need to traverse a backhaul path between the base station and the base station controller. More specifically, prescribed fields in the control channel are modified to carry one or more prescribed message identifiers that convey different types of information, e.g., an identifier for indicating which mobile station is the intended recipient, an identifier for indicating the type of message being transmitted (e.g., broadcast, multicast, etc.), a message identifier indicating the available Walsh space for data transmission, and so on. In this manner, existing control channel structures and formats can accommodate many different signaling functions directed to either single or multiple mobile stations.

19 Claims, 11 Drawing Sheets

EXPRESS SIGNALING IN A WIRELESS COMMUNICATION SYSTEM

TECHNICAL FIELD

The invention relates generally to wireless communication systems and, more particularly, to the transmission of signaling information in such systems.

BACKGROUND OF THE INVENTION

The radio subsystem (RSS) of a wireless communication network typically comprises base station subsystems (BSS) and mobile stations (MS). A typical base station subsystem includes a base station controller (BSC) and all the base stations (BS) that it controls. The base stations, in turn, communicate with mobile stations such as digital/cellular phones and the like. In wireless communications, an air interface is used for exchanging information between the mobile stations, base stations, base station controllers, and so on. More specifically, the air interface typically comprises a plurality of communication channels for exchanging voice, data, and/or signaling information.

FIG. 1 illustrates an exemplary and well-known radio interface protocol architecture 100 for a typical wireless communication network and, in particular, shows the termination points at the various layers of the protocol. The physical (PHY) layer 101, which is terminated in base station 105 (also commonly referred to as Node-B) provides the functionality for modulation, coding, spreading, and so on for transmissions between base station 105 and mobile station 106. The media access control (MAC) layer 102, which is terminated in base station controller (BSC) 107 (also referred to as radio network controller), provides the multiplexing and medium access control functions. The radio link control (RLC) layer 103, which is also terminated in base station controller 107, provides the well-known automatic repeat request (ARQ) functionality for wireless transmissions. The radio resource control (RRC) layer 104 is also terminated in base station controller 107 and handles the control plane signaling of layer 3 messages between the network and mobile station 106. Layer 3 signaling typically includes, by way of example: system information broadcasting from the network to all mobile stations; establishment, re-establishment, maintenance and release of a radio resource control connection between a mobile station and the network; establishment, reconfiguration and release of radio bearers; assignment, reconfiguration and release of radio resources for the radio resource control connection; measurement signaling; and so on.

In the evolving wireless data systems, such as the well-known 1x-EV-DO and 1xEV-DV standards as well as the High Speed Downlink Packet Access (HSDPA) specification in the Universal Mobile Telecommunication System (UMTS) standard, the scheduling function is moved from base station controller 107 to base station 105 in order to provide "fast" scheduling based on channel quality feedback from the users. Moreover, new technologies such as adaptive modulation and coding (AMC) and hybrid ARQ (HARQ) have also been introduced to improve the overall system capacity. In general, a scheduler selects a user for transmission at a given time and adaptive modulation and coding allows selection of the appropriate transport format (modulation and coding) for the current channel conditions seen by the user.

FIG. 2 shows radio interface protocol architecture 110, which is similar in all respects to that shown in FIG. 1, except that media access control—high speed (MAC-hs) 111 is provided to handle the scheduler, AMC and Hybrid ARQ functions. Because MAC-hs 111 is terminated at base station 105, a fast response time can therefore be realized since base station 105 is closer to mobile station 106 than is base station controller 107. As is well known, MAC-hs 111 manages the data transmitted on the air interface. Moreover, MAC-hs 111 is used to manage the physical resources allocated to High Speed Downlink Packet Access (HSDPA), for example. In general, the functions carried out by MAC-hs 111 include flow control, scheduling/priority handling, Hybrid ARQ, and a physical layer transport format, e.g., modulation, coding scheme, etc. as shown in FIG. 3.

The signaling function in existing wireless architectures and protocols suffer from several disadvantages, namely delay and inefficient resource allocation and usage. In particular, certain signaling and control functions are handled in an indirect manner that adds unnecessary delay to the transmission and uses bandwidth that could otherwise be used more efficiently for other purposes, e.g., for data transmission to mobile stations. For example, FIGS. 4 and 5 illustrate a few exemplary scenarios in which these problems arise. In FIG. 4, for example, signaling between base station 105 and mobile station 106 is carried out via base station controller 107 as shown by signaling message 150 that is first sent from base station 105 to base station controller 107 and then by signaling message 151 that is subsequently sent from base station controller 107 to mobile station 106. This indirect signaling takes place via radio resource control (RRC) layer 104 (FIG. 1). As such, the RRC-based signaling can be slow depending on delays in the network as well as use of longer frames for transmission (e.g., the HSDPA uses 2.0 millisecond frames while the RRC signaling layer 104 uses 10 millisecond or larger frames). Moreover, when a control message related to MAC-hs 111 needs to be transmitted to mobile stations, the information is first sent via MAC-hs 111 in base station 105 to RRC layer 104 in base station controller 107, which then forwards the signaling message to mobile station 106.

FIG. 5 illustrates another disadvantage of the existing transmission schemes. In particular, data transmissions over the air interface are sent separately to each of mobile stations 106 and 160 from base station 105 as shown by transmissions 161-164. Utilizing the resource (i.e., air interface) in this manner is not an efficient use of capacity, especially in the case where the same data or signaling transmission needs to be transmitted to multiple mobile stations (e.g., broadcast, multicast, etc).

Accordingly, the aforementioned signaling and transmission schemes have significant disadvantages in terms of introducing large signaling delays and degradation to system capacity (e.g., resource allocation).

SUMMARY OF THE INVENTION

Delays are substantially reduced and system capacity is efficiently managed according to the principles of the invention by providing a direct signaling and addressing mechanism between a base station and a mobile station using existing control channel structures and formats. In particular, delays are substantially reduced by providing a direct (or express) signaling path that does not require signaling intended for a mobile station from a base station to first traverse a "backhaul" path from the base station to its base station controller. System capacity is more efficiently managed than in prior arrangements because the direct signaling method according to the principles of the invention does not require separate signaling or control channels. Instead, existing control channel structures and formats are modified to provide additional signaling capability directly between the base station and mobile station.

According to one illustrative embodiment of the invention, a method is described for transmitting control information between a base station and one or more mobile stations in a wireless communication network in which one or more prescribed fields in an existing control channel are modified to enable express signaling directly between the base station and at least one mobile station. More specifically, prescribed fields in the control channel are modified to carry one or more prescribed message identifiers that convey different types of information, e.g., an identifier for indicating which mobile station is the intended recipient, an identifier for indicating the type of message being transmitted (e.g., broadcast, multicast, etc.), a message identifier indicating the available Walsh space for data transmission, and so on. In this manner, existing control channel structures and formats can accommodate a plurality of signaling functions directed to either single or multiple mobile stations, e.g., unicast, multicast, broadcast, and so on. Using the well-known HSDPA specification of the UMTS standard as an example, the express signaling capability can be provided via the MAC-hs protocol layer between the base station and mobile stations.

The signaling method according to the principles of the invention therefore provides several advantages as compared with the prior arrangements. For example, the express signaling method does not require a complex implementation since the mobile station does not need to decode any additional control channels. Secondly, efficiency is realized since code resources are only needed for the existing control channel (e.g., the High Speed Shared Control Channel (HS-SCCH) in the HSDPA implementation). The express signaling capability is flexible and versatile in that the base station can transmit various customizable signaling messages to the mobile stations at any time.

BRIEF DESCRIPTION OF THE DRAWING

A more complete understanding of the present invention may be obtained from consideration of the following detailed description of the invention in conjunction with the drawing, with like elements referenced with like reference numerals, in which.

DETAILED DESCRIPTION

Although the principles of the invention are particularly well-suited for wireless communications systems based on the well-known High Speed Downlink Packet Access (HSDPA) specification in the Universal Mobile Telecommunication System (UMTS) standard, and will be described in this exemplary context, it should be noted that the embodiments shown and described herein are meant to be illustrative only and not limiting in any way. As such, various modifications will be apparent to those skilled in the art for application to other transmission systems and are contemplated by the teachings herein.

Before addressing the illustrative embodiments of the invention, the channel structure and signaling operation of a typical wireless communication system according to the HSDPA standard will be described to provide a context for understanding the principles of the invention.

In the HSDPA standard, a High Speed Downlink Shared Channel (HS-DSCH) is used for transmissions from a base station to a plurality of mobile stations (e.g., user equipment). Signaling information corresponding to a data transmission in a HS-DSCH is transported via dedicated Downlink Physical Channels (DPCHs) as well as via Shared Control Channels (SCCHs). More specifically, a separate, dedicated Downlink Physical Channel (DPCH) is assigned to each mobile station and is used, in one exemplary function, for indicating when a respective mobile station has a transmission during a particular transmission time interval. In addition to the dedicated control channels, there are also a plurality of Shared Control Channels (SCCHs) that are associated with the High Speed Downlink Shared Channel (HS-DSCH). The Shared Control Channels (SCCHs) are used for transmitting signaling information that is needed for the mobile station to process the corresponding data transmission. By way of example, signaling information in the Shared Control Channels (SCCHs) can include transmission format information such as code information (which codes are used for the data transmission), modulation information, Transport Block Set Size (TBSS), and so on. The Shared Control Channels (SCCHs) are used on a shared basis among all the mobile stations such that a mobile station would read a Shared Control Channel (SCCH) only upon an indication (e.g., via its dedicated DPCH) that the Shared Control Channel (SCCH) is intended for that particular mobile station.

Figure 6:
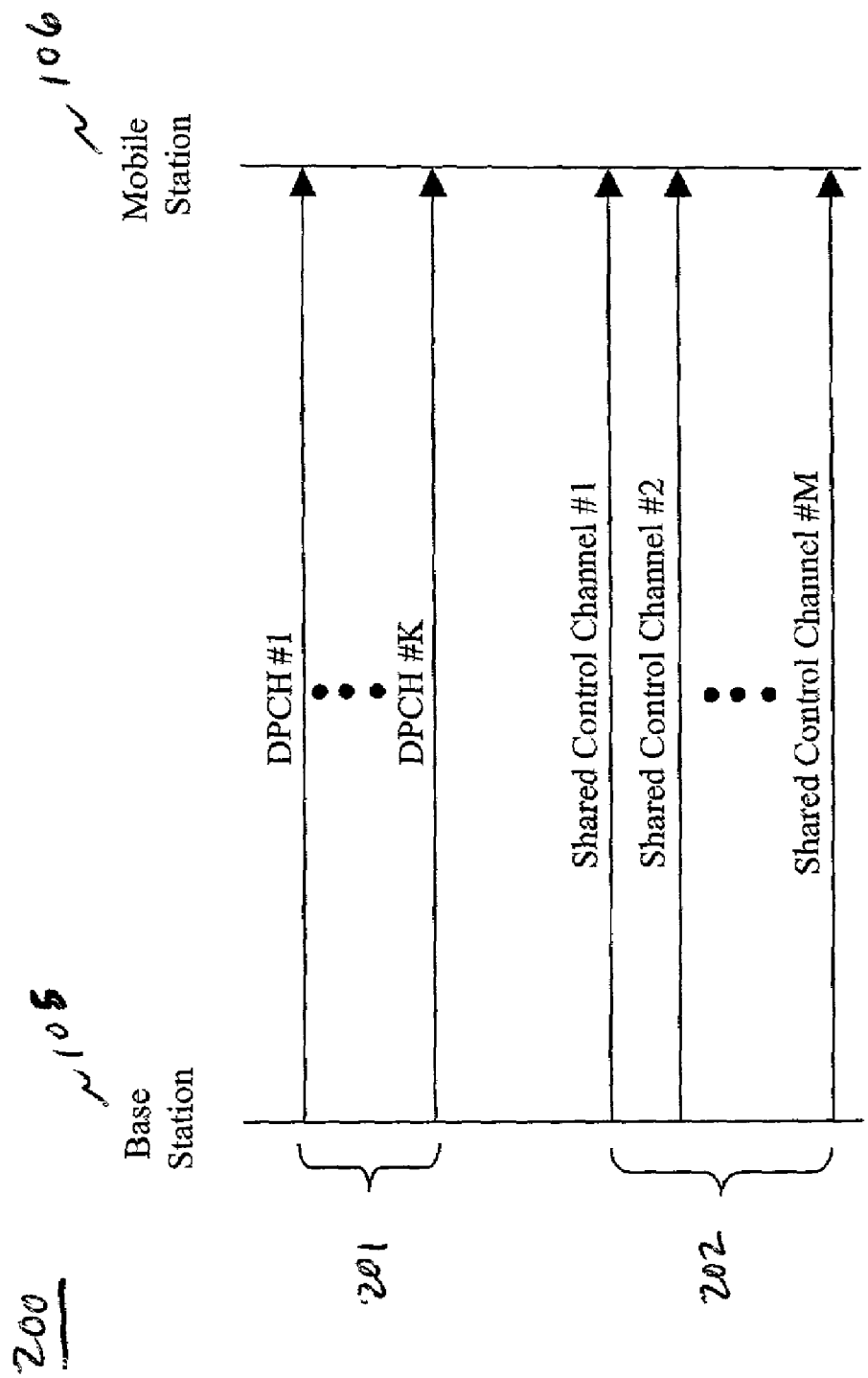
FIG. 6 shows a simplified diagram of signaling channels associated with a high speed downlink shared channel in a wireless communication system.

FIG. 6 shows an exemplary physical channel structure 200 for downlink signaling corresponding to the High Speed Downlink Shared Channel (HS-DSCH) from the perspective of a mobile station. In particular, each mobile station (user) has a dedicated Downlink Physical Channel (DPCH) 201, e.g., a separate DPCH for each of users 1 through K in this example. Multiple, code-multiplexed Shared Control Channels (SCCHs) 202, e.g., 1 through M in this example, are also used on a shared basis among all the users for signaling information. In the current version of the HSDPA standard, the number of Shared Control Channels (SCCHs) can range from a minimum of one (M=1) to a maximum of four (M=4) and each Shared Control Channel (SCCH) corresponds to a separate user (e.g., mobile station). In the example where M=4, each of the K Downlink Physical Channels (DPCHs) and four (4) Shared Control Channels (SCCHs) for a subset of the K users would therefore be transmitted in each frame (e.g., transmission time interval (TTI) in HSDPA). Future versions of the HSDPA specification may not be limited in this manner, e.g., more than four Shared Control Channels (SCCHs) may be used, multiple Shared Control Channels (SCCHs) for a particular user, and so on.

In a typical transmission scenario according to the current HSDPA specification, a HS-DSCH Indicator (HI) is transmitted in a particular user's dedicated Downlink Physical Channel (DPCH) to indicate to that user that one of the Shared Control Channels (SCCHs) in that same Transmission Time Interval (TTI) needs to be decoded by that user. Accordingly, the HS-DSCH Indicator (HI) is sent either in parallel or prior to the Shared Control Channel (SCCH) that is to be read by the user. If a HS-DSCH Indicator (HI) is not present in a particular user's dedicated Downlink Physical Channel (DPCH), then that user does not have to decode a Shared Control Channel (SCCH).

Figure 1:
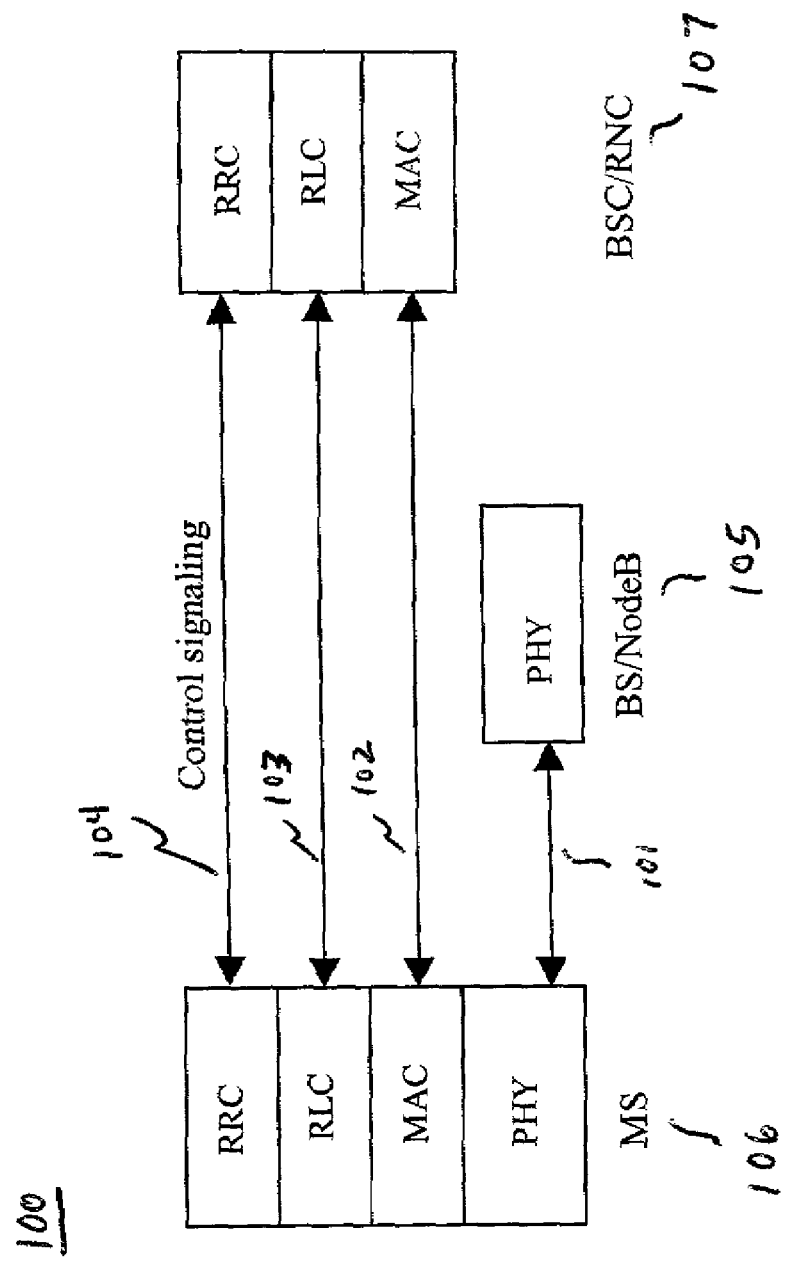
FIGS. 1 and 2 show simplified block diagrams of control and signaling architectures for wireless communications according to the prior art.
Figure 2:
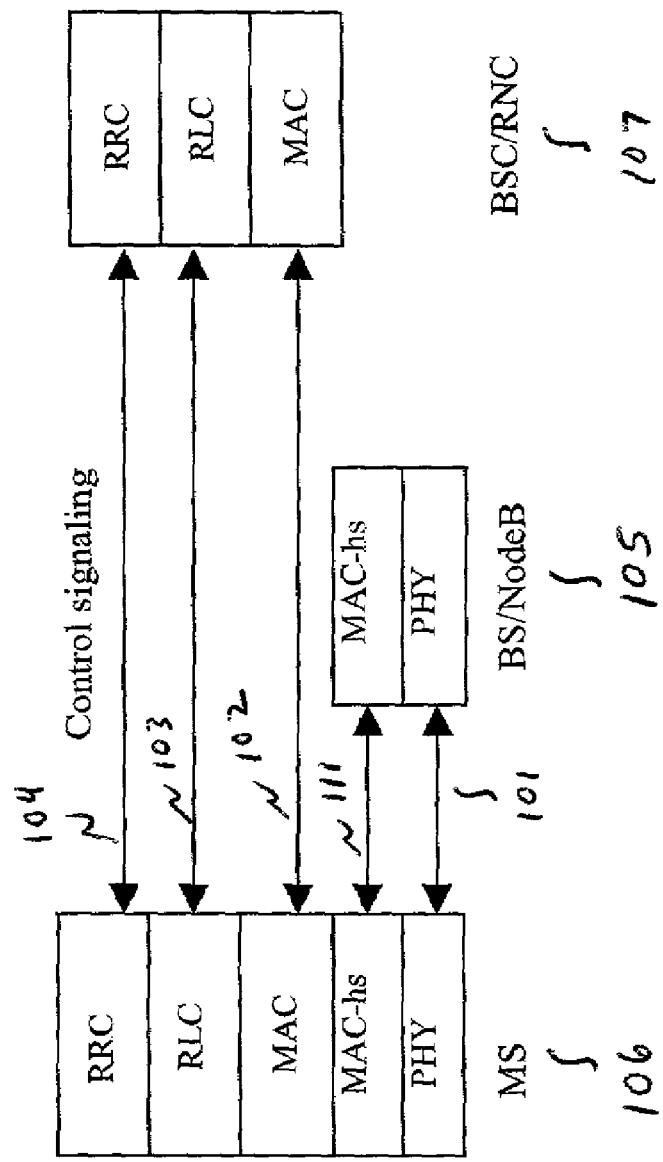
Figure 3:
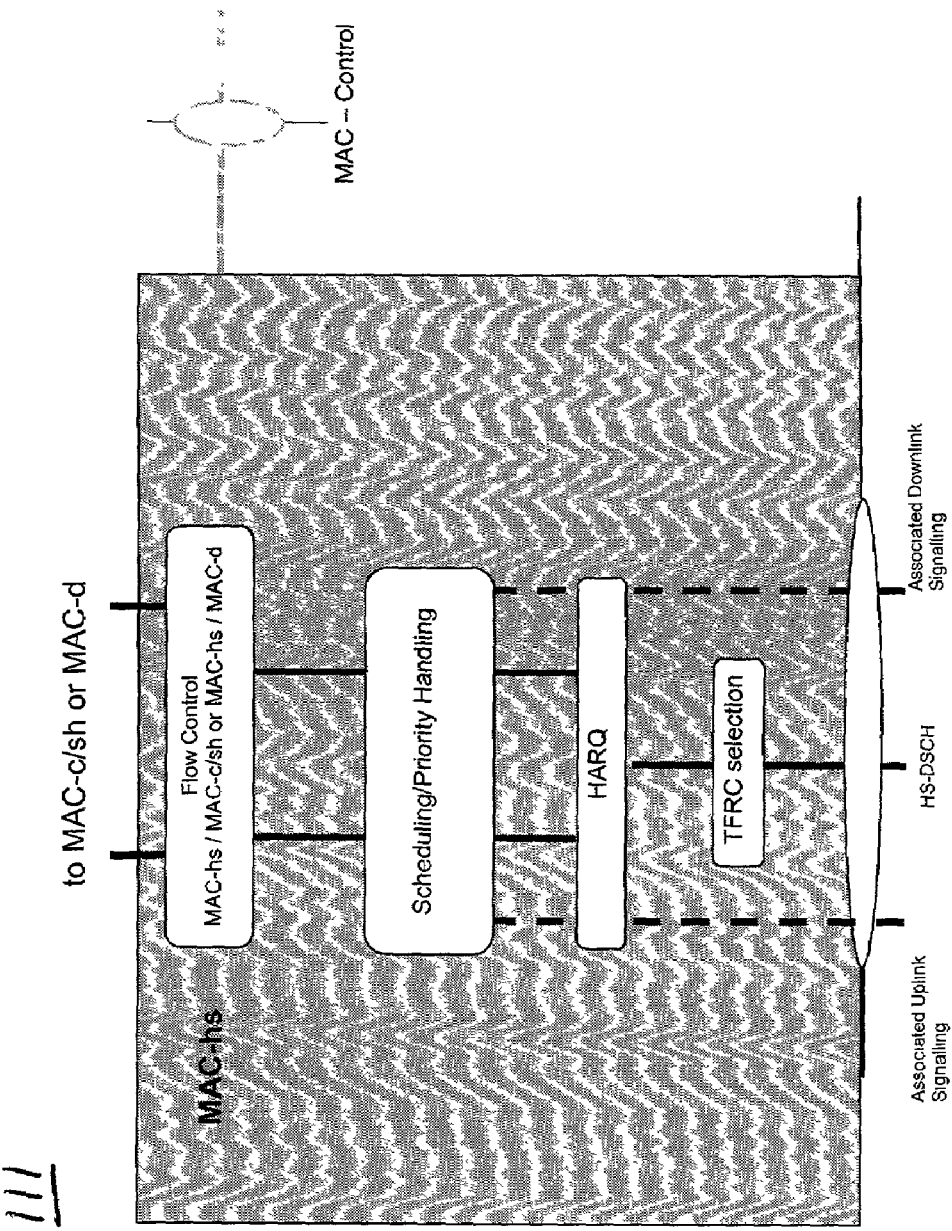
FIG. 3 shows a simplified block diagram of one control layer of the architecture shown in FIG. 2.
Figure 4:
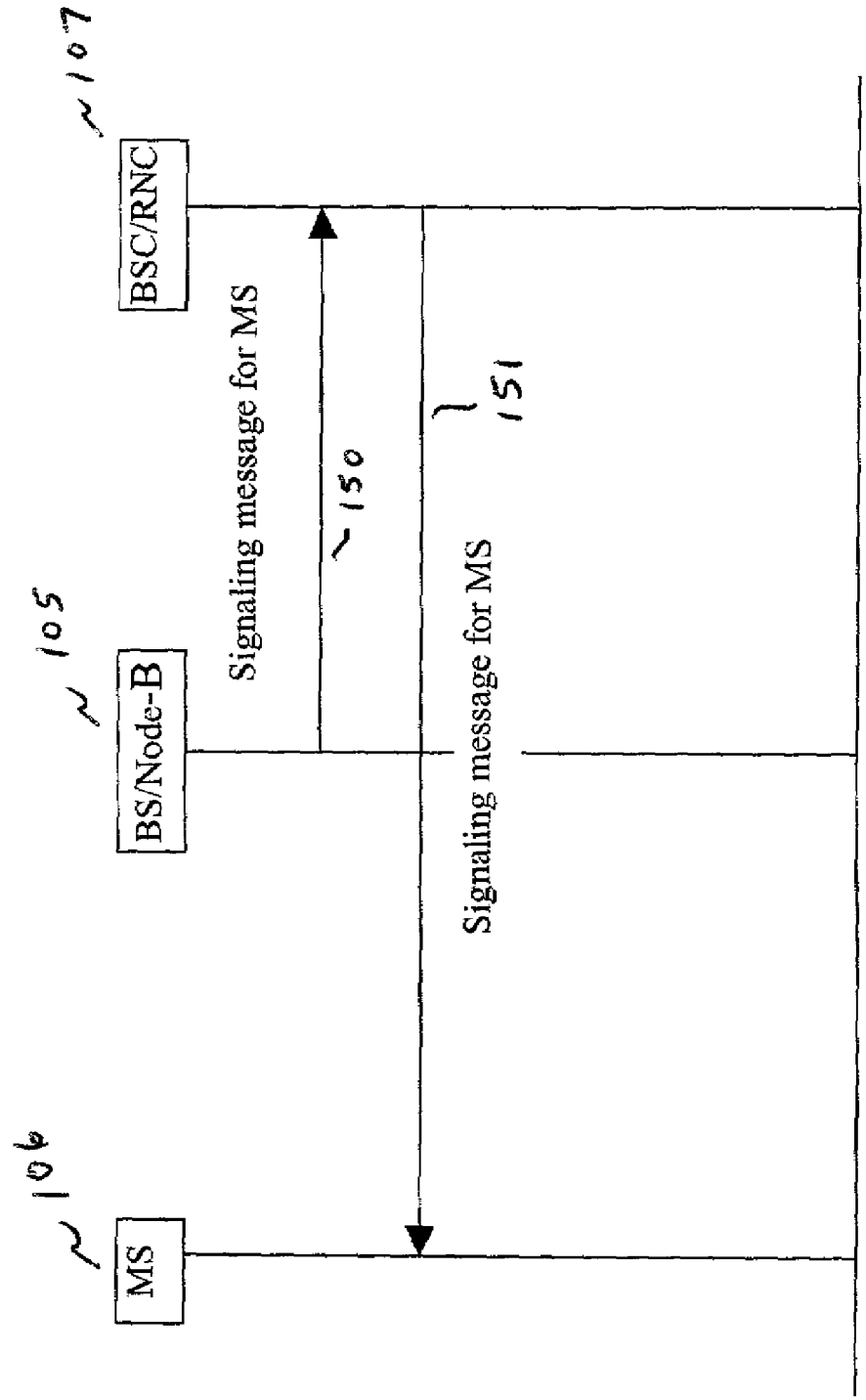
FIGS. 4 and 5 show simplified transmission flow diagrams illustrative of signaling and data transmission in prior art arrangements.
Figure 5:
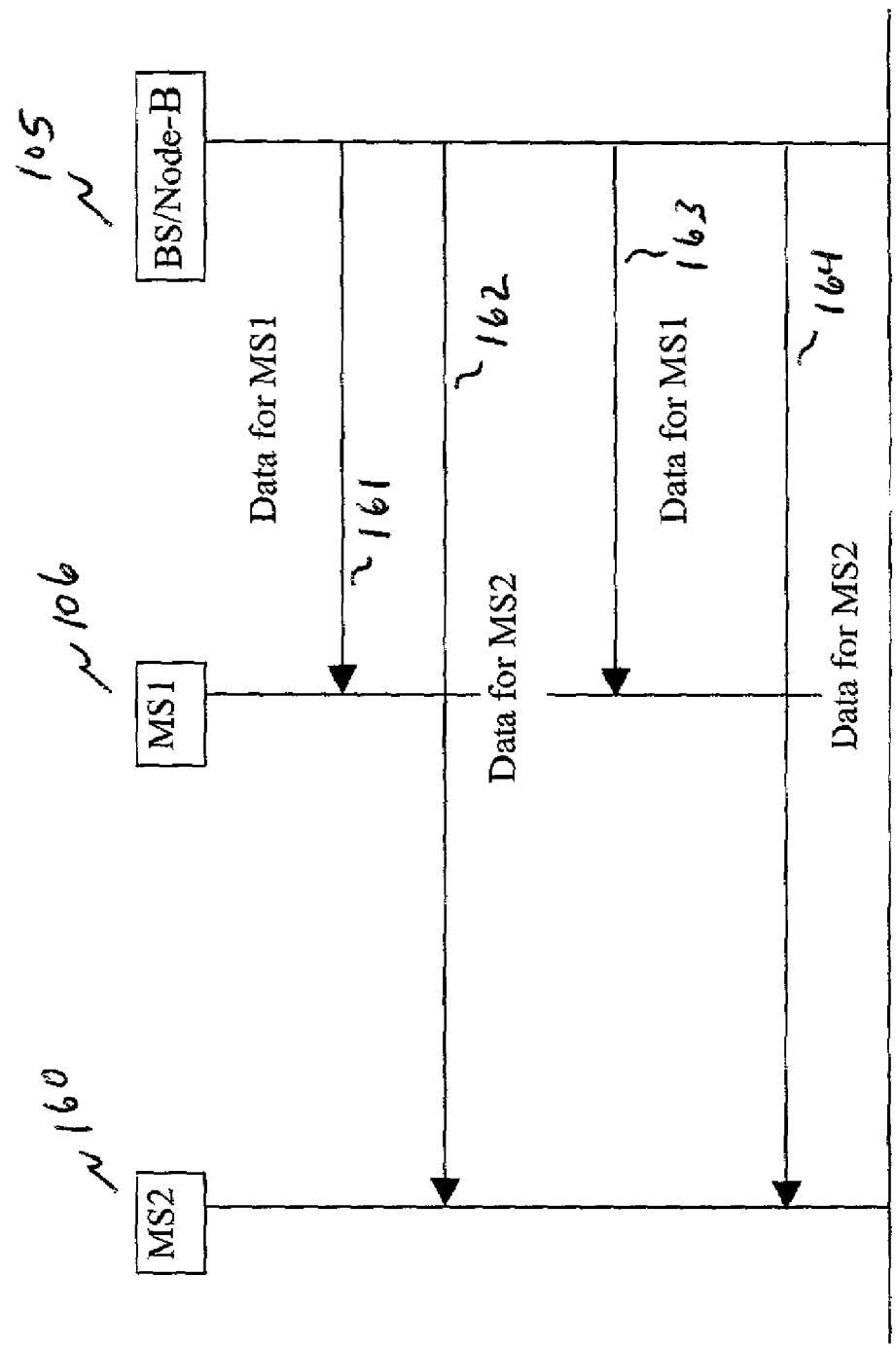
Figure 7:
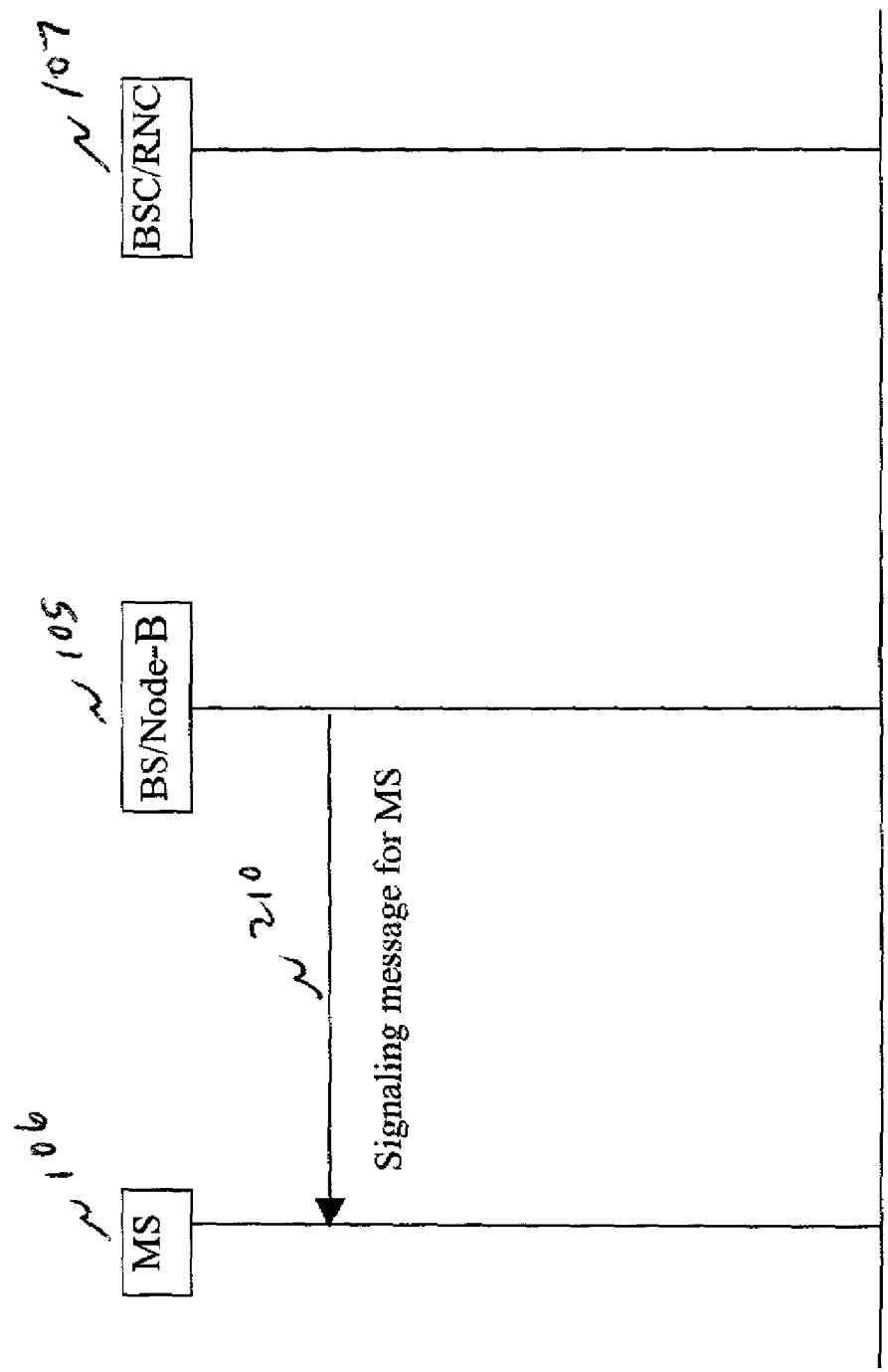
FIG. 7 shows a simplified transmission flow diagram illustrative of signaling according to the principles of the invention.

According to the principles of the invention, signaling messages are transmitted directly from a base station to a mobile station without traversing the backhaul path between the base station and its respective base station controller. FIG. 7 shows a simplified transmission flow diagram illustrating the direct signaling that occurs via message 210 between base station 105 and mobile station 106. This transmission flow can be contrasted with that shown in FIG. 4 where the signaling message 150 must first traverse backhaul path between base station 105 and base station controller 107. In one exemplary embodiment, the signaling mechanism for carrying the messages is the MAC-hs protocol layer 111 (FIGS. 2 and 3). Because of the direct signaling method, bandwidth is conserved both over the air interface between base station 105 and mobile station 106 as well as over the backhaul path between base station 105 and base station controller 107.

As described, a HSDPA wireless communication system employs a control channel, e.g., the High-Speed Shared Control Channel (HS-SCCH), which is also used for carrying the scheduling and Hybrid ARQ control information for the current transmission to a mobile station. Similarly, a wireless communication system based on the 1xEV-DV standard employs a Forward Secondary Packet Data Control Channel (F-SPDCCH) for these purposes. As such, those skilled in the art will appreciate the applicability of the principles of the invention to the various wireless standard-based systems even though the terminology described hereinafter will be particularly applicable in the context of HSDPA.

Figure 8:
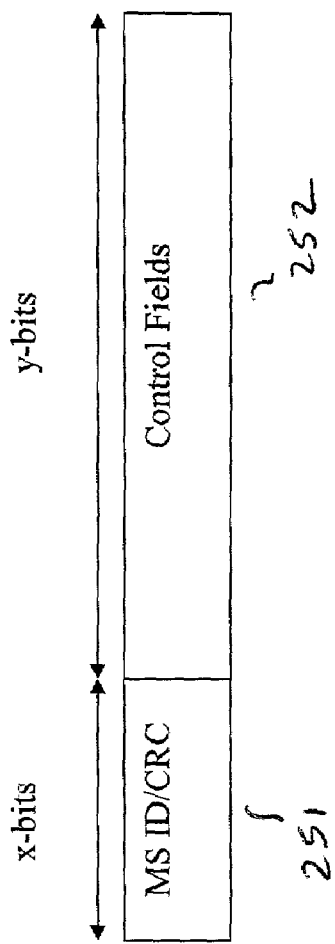
FIG. 8 shows a simplified block diagram of a communication channel format for a control channel according to one exemplary embodiment of the invention.

FIG. 8 shows a simplified control channel format that is contemplated for use in accordance with the teachings herein. In particular, this control channel structure (format) and/or the contents thereof are modified according to the principles of the invention to provide additional signaling directly between the base station and mobile station. It should be noted that the control channel would still be used for its originally intended purposes, however, modifications to the existing control channel structure are the vehicle by which the additional signaling capability is provided according to the principles of the invention. As such, we have discovered a way in which to use existing control channel structure and communications to effect additional signaling that enhances the functionality of wireless communications, e.g., reducing delay, enhancing bandwidth utilization, and so on.

Returning now to FIG. 8, control channel frame 250 includes a field for carrying a mobile station identification (MS ID/CRC) 251 that identifies the mobile station for which the current transmission is intended. In this simplified example, the length of field 251 is shown to be x bits. Control channel frame 250 is also shown to include y bits of control fields 252, which will be described in further detail below. As those skilled in the art will understand, the mobile station identification 251 (field 251) can either be explicitly transmitted or implicitly transmitted depending on the convention used in the particular wireless system. For example, an explicitly transmitted mobile station identification would comprise a prescribed bit sequence in field 251 that would correspond to the mobile station that is the intended recipient. In another alternative embodiment, identification of the intended mobile station for receiving and decoding the transmission can be implemented in the so-called implicit manner. For example, a cyclic redundancy check (CRC) calculation can be the basis for identification. As will be described in further detail below, a user-specific CRC calculation would be performed and transmitted along with the other control frame contents. If the CRC matches at a mobile station, then that mobile station knows to decode that particular transmission. It is also possible to include both an explicit, prescribed mobile station identification (e.g., bit sequence) as well as a user-specific CRC.

Following from the generic control channel format shown in FIG. 8, Table 1 summarizes the types of control fields utilized in the control channel structure of the HS-SCCH channel in the context of an HSDPA-based system. For this exemplary implementation, it is assumed that an implicitly transmitted mobile station identification 251 is being used (e.g., a x-bit CRC calculated over the control fields 252). As shown in Table 1, y=20, e.g., a total of 20 bits.

TABLE 1

| Type | SCCH Control Fields | Size (bits) |
| --- | --- | --- |
| Transport-format and Resource related Information (TFRI) | Channelization code set | 7 |
| | Modulation | 1 |
| | Transport block set size and transport channel identity | 6 |
| Hybrid-ARQ-related Information (HARQ information) | Hybrid-ARQ process number | 3 |
| | Redundancy version | 2 |
| | New-data indicator | 1 |

Figure 9:
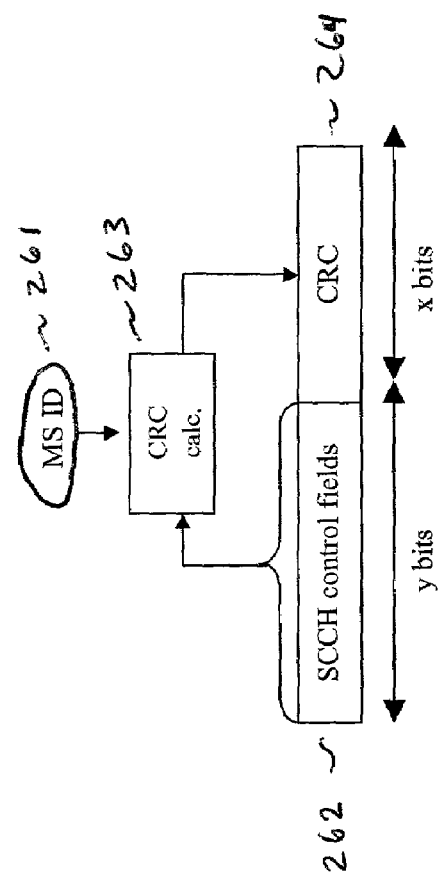
FIG. 9 shows one exemplary embodiment for calculating cyclic redundancy checks (CRCS) according to one illustrative embodiment of the invention.

FIG. 9 illustrates one example of how a x-bit CRC calculation can be used to implicitly transmit the mobile station identification according to one illustrative embodiment. More specifically, a user-specific mobile station identification 261 is appended to the SCCH control fields 262 (e.g., as shown in Table 1). A standard CRC calculation 263 is then performed. At the time of transmission, the user-specific mobile station identification 261 is removed so that only the control fields 262 and the calculated CRC 264 are transmitted. When a mobile station receives the control channel (e.g., the HS-SCCH transmission), it will append its user-specific mobile station identification 261 to the control field 262 and a CRC check will then be performed. If the CRC is valid, then the mobile station processes the received transmission. If the CRC is not valid (i.e., does not match), then the mobile station will ignore the corresponding transmission on the HS-DSCH.

Other ways of obtaining a user-specific CRC will be apparent to those skilled in the art and are contemplated by the teachings herein. For example, an exclusive-OR logic operation can be performed between the explicit mobile station identification 261 (prescribed bit sequence) and the CRC calculated over the HS-SCCH control fields.

In the HSDPA standard, for example, a mobile station only looks for its own identification code in field 251 (FIG. 8). According to the principles of the invention, the control channel fields can be modified to include prescribed identifiers that apply to more than one mobile station. For example, one prescribed identifier can be used (e.g., in field 251, FIG. 8) to indicate that the transmission is a broadcast transmission. As such, each mobile station receiving the control channel having the broadcast identifier as the mobile station identification (e.g., field 251 in FIG. 8) would then know to decode the transmission. Similarly, another prescribed identifier could be used to indicate a multicast transmission for a subset of the total number of mobile stations. In this manner, the signaling capability between the base station and the mobile stations can be greatly enhanced in that many different identifiers can be used for different signaling and control purposes. As such, numerous other modifications and variations will be apparent to those skilled in the art and are contemplated by the teachings herein.

Figure 10:
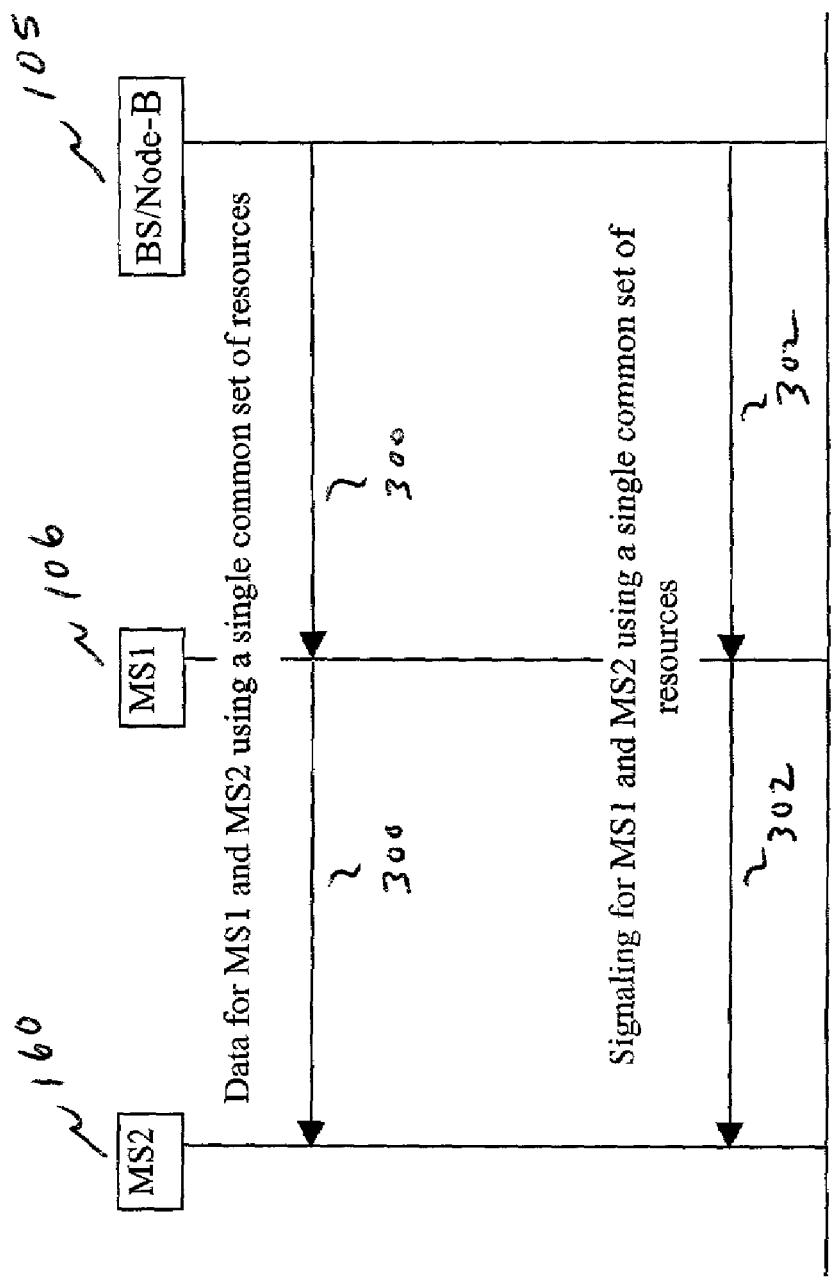
FIG. 10 shows a simplified transmission flow diagram illustrative of signaling and data transmission according to the principles of the invention.

FIG. 10 is a simplified transmission flow diagram illustrating the bandwidth conservation aspects of this approach, i.e., when a single identifier is used for a transmission intended for multiple mobile stations using a common set of resources. FIG. 10 shows two exemplary transmissions, e.g., data transmission 300 simultaneously sent to both mobile stations 106 and 160 and signaling message 302 simultaneously sent to both mobile stations 106 and 160. Accordingly, this approach provides a more efficient way to utilize the scarce radio resources in wireless communication systems.

According to another aspect of the invention, various other signaling messages can also be transmitted over the control channel (e.g., HS-SCCH in HSDPA) using specifically assigned (prescribed) identifiers, referred to hereinafter more generically as message identifiers (MIDs). By way of example, a message identifier (MID) can be used both to indicate the recipient (mobile station) of the message as well as to convey the meaning of the actual message (e.g., interpretation of the HS-SCCH fields contents). Accordingly, message identifiers (MIDs) are not inherently user-specific. Using this scheme, small signaling messages can be sent to the mobile stations using the HS-SCCH frames.

Figure 11:
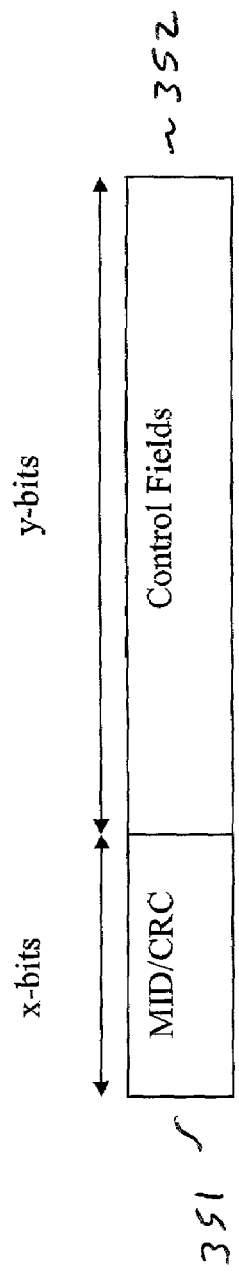
FIGS. 11 and 12 show simplified block diagrams of communication channel formats for a control channel according to exemplary embodiments of the invention.
Figure 12:
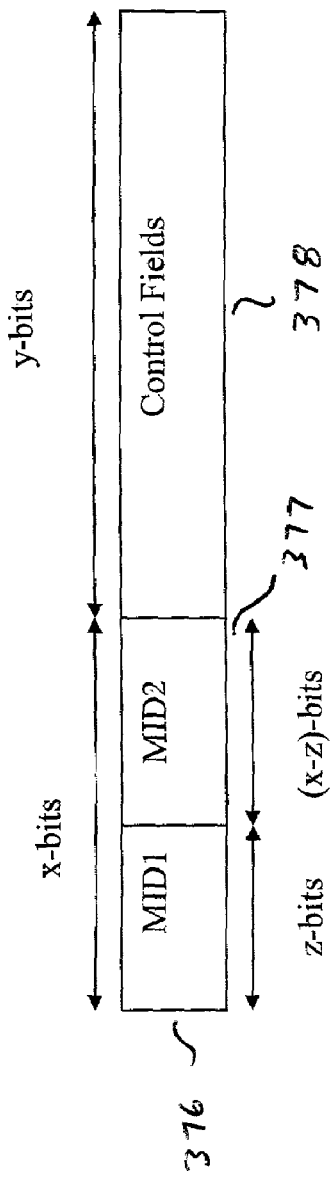

FIGS. 11 and 12 illustrate two exemplary control channel formats using the expanded message identifier functionality. More specifically, control channel format 350 includes a x-bit message identifier/CRC field (MID/CRC) 351 and a y-bit control field 352. This example is consistent with the previous example in FIG. 8 except that customizable message identifiers are used instead of the user-specific identifiers that were applicable to a particular mobile station.

In operation, message identifier 351, upon receipt by a mobile station, would indicate that the control channel 350 is a "fast" (or express) signaling message from the base station. As such, the mobile station would read the contents of control field 352 differently than in the customary manner (e.g., if the identifier was the normal user-specific identifier). In particular, the contents of control field 352 would now include the "fast" signaling message to effect an appropriate action by the mobile station.

FIG. 12 shows yet another exemplary control channel format 375 according to the principles of the invention in which a two-part x-bit message identifier is used. More specifically, a first message identifier (MID1) 376 having a bit sequence length of z bits is used together with a second message identifier (MID2) 377 having a bit sequence length of x-z bits. Again, a y-bit control field 378 is also included as will be described in detail below. One way to use the two-part message identifier is to use the first message identifier 376 (MID1) as a user-specific mobile station identifier (e.g., as in the customary usage in today's networks) while the second message identifier 377 (MID2) could be used as the signaling message identifier (e.g., identifying to the respective mobile station or stations that the contents of control field 378 constitute a signaling message in accordance with the teachings of the invention (e.g., an express signaling message). Other variations and modifications for the two-part identifier field will be apparent to those skilled in the art. For example, first and second message identifiers 376 and 377 may each be transmitted explicitly (prescribed bit sequences) or implicitly transmitted (e.g., the aforementioned CRC method) or a combination of both, e.g., MID1 376 implicitly transmitted via a CRC calculation and MID2 377 explicitly transmitted, and so on.

Figure 13:
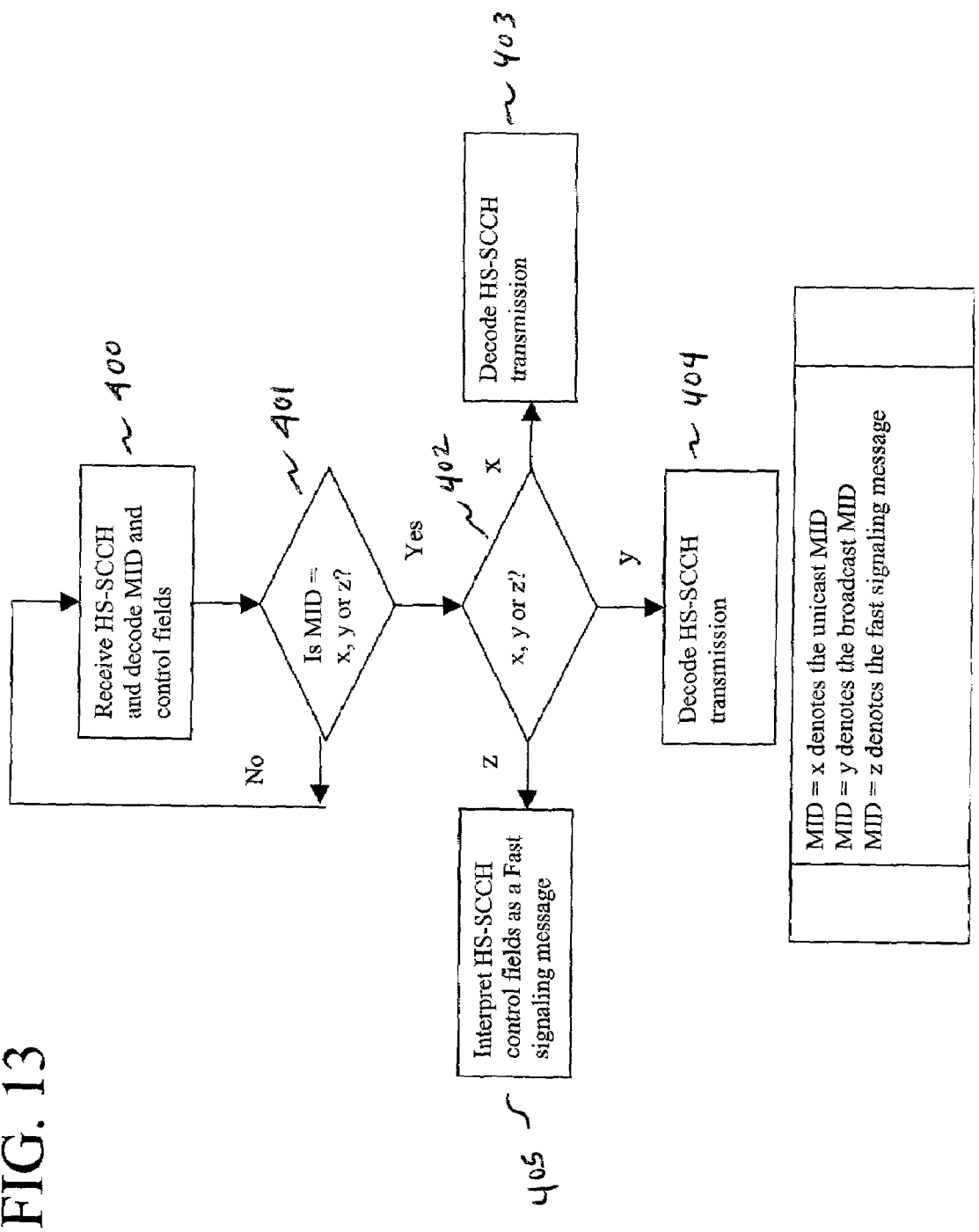
FIG. 13 shows a flow diagram illustrating how the contents of a control channel are processed according to one exemplary embodiment of the invention.

FIG. 13 shows an exemplary flow diagram for how a mobile station could process an incoming control channel using the message identifier approach according to the principles of the invention. In this example, a first message identifier x represents a unicast transmission, a second message identifier y represents a broadcast transmission, and a third message identifier z represents a "fast" or express signaling message. In step 400, the mobile station receives the control channel (e.g., HS-SCCH in HSDPA) and decodes the message identifier field (MID) and the control fields. In step 401, a determination is made as to whether MID=x, y, or z. If not, then the mobile station ignores the transmission as not being applicable. If MID equals x, as determined in step 402, then the mobile station would decode the control channel transmission as shown in step 403 since the transmission is a unicast transmission for that mobile station. If MID equals y, as determined in step 402, then the mobile station would also decode the control channel transmission as shown in step 404 since the transmission is a broadcast transmission for that mobile station and others. If MID equals z, as determined in step 402, then the mobile station would know that the message is a "fast" or express signaling message from the base station and would then treat the contents of the control fields (e.g., 352, 378 in FIGS. 11 and 12 respectively) as the actual signaling message to initiate the appropriate control or signaling functions.

As previously stated, the number and different types of signaling messages that can be used can be quite extensive, limited only by the size of the control fields available within the particular control channel being used. For example, the 20 bit control field (in addition to the CRC bits) in an HSDPA control channel (e.g., HS-SCCH) can be used to transmit many different signaling messages between the base station and mobile stations.

The following examples of signaling functions that can be supported according to the principles of the invention are not meant to be an exhaustive list, but rather only illustrative of the range of possibilities when using the existing control structure to provide the express signaling capability. As such, other modifications and variations will be apparent to those skilled in the art and are contemplated by the teachings herein. Some examples include:

Information about how the control channel (e.g., HS-SCCH) is configured. For example, the mobile station can be signaled to monitor only one HS-SCCH when the buffers for the mobile station in the base station are empty. It should be noted that, when the MAC-hs buffers for the mobile station are empty, the mobile station is not a "schedulable" mobile station. When the data for the mobile station arrives in MAC-hs buffers, the mobile station can be signaled by the base station via express signaling to monitor more than one HS-SCCH if needed. For example, the identifiers for the HS-SCCHs to be monitored can be carried in the MAC-hs signaling message.

HARQ parameters. The configuration and reconfiguration of the number of Hybrid ARQ processes can be conveyed using express signaling between the base station and mobile stations. Moreover, information about the maximum number of Hybrid ARQ retransmission attempts can also be signaled in this manner.

Channel Quality Indication Rate. When data shows up in MAC-hs buffers, the base station can send a MAC-hs "fast" message to the mobile station specifying the channel quality indication rate. Similarly, when the buffers in the base station for a particular mobile station goes empty, the base station can send an HS-SCCH message to lower (or stop) the channel quality indication rate in order to conserve the uplink resources.

Power offset for HS-DPCCH in HSDPA. The base station can also signal the power offset for the HS-DPCCH. It should be noted that different offsets can be signaled for the ACK/NACK and channel quality indication. Moreover, different offsets can be set for ACK and NACK separately.

Traffic/pilot power for 16-QAM demodulation. The total power allocated to the HS-PDSCH (in HSDPA) varies rather slowly and therefore this parameter need not be carried every transmission time interval. Therefore, "fast" signaling can also be used to carry the traffic/pilot ratio for 16-QAM demodulation.

Abort indication. The MAC-hs can signal the abort indication to the reordering entity in the receiver if the transmitter gives up on a PDU after the maximum number of HARQ retransmission attempts is reached. This will enable quick delivery of the data blocks to the higher layers without waiting for the expiration of the timer.

It should also be noted that an express (or fast) signaling message sent by the base station to the mobile stations can also include a combination of parameters. Using the above examples, a signaling message sent just before transmission of the first packet to a mobile station could use the 20-bit control field of the HS-SCCH to carry signaling information about the HS-SCCHs that are configured, the Hybrid ARQ processes, channel quality indication rate, power offset for HS-DPCCH, and traffic/pilot power together. Again, one of the benefits is that all this signaling information is directly sent by the base station to the mobile station and done so in a 2 millisecond frame, for example.

In view of the foregoing, it should be apparent that express signaling messages sent by the base station to mobile stations on the existing control channel (e.g., HS-SCCH) can be identified by either extending the mobile station identification field (e.g., field 251 in FIG. 8) or defining new message identifiers (e.g., MID 351 in FIG. 11). When the mobile station identification field is used as the signaling message identifier, the mobile station will not only look for its normal mobile station identification in the control channel, but also for the signalling message identifiers. Note that, in this case, the mobile station identification and signalling message identifier share the same space. When a mobile station sees an identifier specific to a signaling message, it will interpret the contents of the control channel accordingly. The mobile station identification field can be used for both the dedicated signaling messages and common signaling messages. For common signaling purposes, a single identifier can be used to identify the signaling message sent to multiple mobile stations. For example, traffic/pilot power can be signaled to multiple mobile stations because this information is common to all mobile stations within a cell. For dedicated signaling messages, however, separate identifiers would possibly be needed for each mobile station.

The message identifiers for "fast" signaling can also be used to distinguish the signaling messages themselves. In this case, the mobile station will first look for its mobile station identification in the control channel. If the mobile station sees its identifier, it will then look for the signaling message identifier to determine the contents of the control channel. It should be noted that the signaling message identifier can be carried explicitly in the control channel and also can be carried implicitly in a similar manner as the user-specific CRC approach previously described.

As is well known, transmissions over the air interface can experience errors for various reasons. As such, acknowledgments (ACK) and negative acknowledgments (NACK) are used for the purpose of improving the reliability of the transmissions. In HSDPA, for example, an ACK/NACK channel exists for performing hybrid ARQ operation on the data channel. Because of the additional messaging and signaling that is taking place over the control channel according to the principles of the invention, the existing ACK/NACK channel and schemes can also be used to ensure reliable transmission over the control channel. For example, fast signaling messages that are lost due to errors in the transmission can be repeated upon receiving a negative acknowledgment (NACK).

As noted previously, the embodiments of the invention have been described in the context of the HSDPA wireless standard, but the principles of the invention are equally applicable to other communication formats as well. By way of further illustration, the 1x-EV-DV wireless standard can benefit from the additional signaling capability described herein. One example is provided below, but many other examples will be apparent to those skilled in the art.

More specifically, the forward link in the 1x-EV-DV standard consists of a forward packet data channel (F-PDCH) and several control channels. The control channel that carries the scheduling and Hybrid ARQ control information for the F-PDCH is called the Forward Secondary Packet data Control Channel (F-SPDCCH). The F-SPDCCH carries a user-specific MAC ID and other control information for scheduling of the F-PDCH. The slot structure (1.25 msec) of the F-SPDCCH is shown in Table 2.

TABLE 2

| Field | Length [bits] |
|---|---|
| Payload size | 2 |
| Sub-packet ID + New packet indication | 2 |
| ARQ channel ID | 2 |
| MAC ID | 6 |
| Total | 12 |

According to the principles of the invention in the context of the 1x-EV-DV standard, MAC IDs can be used carry other types of control and signaling information consistent with the preceding embodiments. In order to use the SPDCCH for other control and signaling purposes, different MAC IDs can be used according to the principles of the invention to indicate the type of control/signaling information being carried in the remainder of the SPDCCH, for example. In this manner, users will now look for their user-specific MAC ID (conventional use) as well as prescribed MAC IDs that have been reserved for signaling purposes. If the user sees a MAC ID that is reserved for signaling, then the user will interpret the rest of the fields in the SPDCCH as the signaling message.

One particular example of signaling that can be carried in the control channel (e.g., SPDCCH) is the Walsh Space Indication (WSI). As is well known, the total Walsh space is shared between voice and data transmissions. Therefore, the available Walsh space for data services varies depending upon the Walsh codes used for voice. The Walsh space used for F-PDCH needs to be indicated to the data users on a regular basis.

Table 3 contains a list of 28 32-ary Walsh functions that could be used for the F-PDCH (the F-PDCH Walsh Space List). The order is from top to bottom.

TABLE 3

32-ary Walsh Codes 31
15
23
7
27
11
19
3
29
13
21
5
25
9
30
14
22
6
26
10
18
2
28
12
20
4
24
8

According to the principles of the invention, a specific MAC ID can be reserved for WSI and, when this MAC ID appears in the control channel (e.g., SPDCCH), the users will interpret remaining or other bits in the SPDCCH as the pointer to the available Walsh space. More specifically, and with reference to Table 4, a MAC ID of "000000" and a SP ID of "11" in the control channel (e.g., F-SPDCCH) can be used together to constitute the WALSH_SPACE_INDICATION_ID. When the mobile stations decode and receive this sequence on F-SPDCCH, the mobile stations could then determine the value of a 5-bit pointer (WALSH_SPACE in Table 4) to determine the set of available Walsh codes/functions in the Walsh Space List (shown in Table 3) for the F-PDCH. For example, if WALSH_SPACE equals to six (6), then the top six 32-ary Walsh functions in Table 3 would be those used and the remaining codes/functions would therefore be available for data transmission, and so on.

TABLE 4

| Field | Length (bits) | Value |
|---|---|---|
| WALSH_SPACE_INDICATION_ID | 8 | 00000011 |
| WALSH_SPACE | 5 | xxxxx |
| Total | 13 | 000000xxxxx11 |

It is also possible to extend this signaling approach for the cases where larger signaling messages need to be carried. For example, when a specified MAC ID appears on the SPDCCH, the remaining bits can be used to point to an 32-ary Walsh code that carries additional information. The format of this additional signaling message can be predefined. In the context of the above example, it is also possible that the SPDCCH carries the 32-ary Walsh code ID that will eventually carry the complete bitmap of the available Walsh codes. Other possible variations will be apparent to those skilled in the art and are contemplated by the teachings herein.

Again, it should be noted that the express signaling method according to the principles of the invention is not meant to necessarily replace the control signaling that still is deemed appropriate between a base station controller and mobile stations using the RRC layer. Instead, the express signaling capability uses the existing control channel structure between the base station and its respective mobile stations according to the principles of the invention to expand the overall signaling capability of the system and in such a way that provides direct and faster response for control and signaling functions that can be appropriately handled directly between the base station and its mobile stations.

In general, the foregoing embodiments are merely illustrative of the principles of the invention. Those skilled in the art will be able to devise numerous arrangements, which, although not explicitly shown or described herein, nevertheless embody those principles that are within the scope of the invention. Although many examples of substitutions, modifications and so on were provided in the description, other modifications or substitutions will be apparent to those skilled in the art and are contemplated by the teachings herein. Accordingly, the embodiments shown and described herein are only meant to be illustrative and not limiting in any manner. The scope of the invention is limited only by the claims appended hereto.

We claim:

1. A method for transmitting a plurality of control and signaling information between a base station and one or more mobile stations in a wireless communication network, the method comprising:

modifying one or more prescribed fields in an existing media access control (MAC) channel to carry a plurality of control and signaling information directly between the base station and at least one mobile station by performing a cyclic redundancy check (CRC) calculation over the contents of a control field and mobile station identifier, wherein the control and signaling information includes one or more identifiers, and wherein one or more of the identifiers includes a message type.

2. The method according to claim 1, wherein the control and signaling information includes one or more identifiers, and wherein one or more of the identifiers includes routing information.

3. The method according to claim 2, wherein the routing information indicates the one or more mobile stations for which a transmission is intended.

4. The method according to claim 3, wherein the plurality of control and signaling information comprises and signaling information.

5. The method according to claim 3, wherein the transmission is simultaneously transmitted and intended for a plurality of mobile stations.

6. The method according to claim 2, wherein the message type indicates a type of action to be carried out by a recipient mobile station.

7. The method according to claim 1, wherein the control and signaling information includes message address information for a single mobile station.

8. The method according to claim 1, wherein the control and signaling information includes common message address information for a plurality of mobile stations.

9. The method according to claim 8, wherein the control and signaling information includes an identifier indicating a broadcast transmission to the plurality of mobile stations.

10. The method according to claim 8, wherein the control and signaling information includes an identifier indicating a multicast transmission for a prescribed number of the plurality of mobile stations.

11. The method according to claim 1, wherein the control and signaling information includes an identifier indicating available Walsh space for transmission of data between the base station and the one or more mobile stations.

12. The method according to claim 2, wherein a routing information identifier comprises an explicit set of bits transmitted in a frame of the existing control channel.

13. The method according to claim 1, wherein the existing control channel includes a message identification field and the control field.

14. The method according to claim 13, wherein the control field includes the control and signaling information.

15. The method according to claim 14 wherein the transmission includes the mobile station identifier, the CRC calculation, and the control field.

16. The method according to claim 15 wherein the transmission includes the CRC calculation and the control field, and wherein routing information is derived at a receiving mobile station by performing a CRC calculation on the received transmission together with the receiving mobile station's mobile station identifier.

17. The method according to claim 12, wherein routing information for a transmission is derived via an logical exclusive OR operation performed on the explicit set of bits and a cyclic redundancy check (CRC) calculated on the contents of a control frame in the existing control channel.

18. The method according to claim 13, wherein the message identification field comprises at least two parts, wherein a first part identifies a recipient mobile station for the transmission and wherein a second part indicates a message type.

19. A method for transmitting a plurality of control and signaling information between a base station and one or more mobile stations in a wireless communication network, the method comprising:

modifying one or more prescribed fields in an existing media access control (MAC) channel to carry one or more prescribed message identifiers between the base station and the one or more mobile stations by performing a cyclic redundancy check (CRC) calculation over the contents of a control field and mobile station identifier, wherein the one or more prescribed message identifiers comprise control and signaling information selected from the group consisting of routing information, message type, control information, and a signaling message, whereby express signaling occurs directly between the base station and at least one mobile station.

* * * * *